US011092985B1

(12) United States Patent
Handley et al.

(10) Patent No.: US 11,092,985 B1
(45) Date of Patent: Aug. 17, 2021

(54) APPARATUS, SYSTEMS AND METHODS FOR MANAGING FLUIDS COMPRISING A POPPET VALVE HAVING MULTIPLE SPRINGS

(71) Applicant: 3A Holdings, LLC, Houston, TX (US)

(72) Inventors: Daniel Handley, Spring, TX (US); Michael Morris, Attica, MI (US)

(73) Assignee: 3A Holdings, LLC, Houston, TX (US)

( * ) Notice: Subject to any disclaimer, the term of this patent is extended or adjusted under 35 U.S.C. 154(b) by 83 days.

(21) Appl. No.: 16/685,282

(22) Filed: Nov. 15, 2019

Related U.S. Application Data

(60) Provisional application No. 62/767,905, filed on Nov. 15, 2018.

(51) Int. Cl.
*F16K 15/00* (2006.01)
*G05D 16/10* (2006.01)
*F16K 15/02* (2006.01)
*F16K 15/04* (2006.01)

(52) U.S. Cl.
CPC ............ *G05D 16/10* (2013.01); *F16K 15/021* (2013.01); *F16K 15/026* (2013.01); *F16K 15/044* (2013.01); *Y10T 137/7876* (2015.04); *Y10T 137/7905* (2015.04); *Y10T 137/7927* (2015.04)

(58) Field of Classification Search
CPC ......... Y10T 137/7905; Y10T 137/7927; Y10T 137/7922; Y10T 137/87555; F16K 15/021; F16K 15/026; F16K 15/044
See application file for complete search history.

(56) References Cited

U.S. PATENT DOCUMENTS

| | | | | | |
|---|---|---|---|---|---|
| 1,274,378 | A | * | 8/1918 | Breitstein | F16K 17/0406 137/529 |
| 1,407,358 | A | * | 2/1922 | Thaxton | F04B 41/02 137/529 |
| 1,679,938 | A | * | 8/1928 | Kimball | F16K 17/044 137/523 |
| 1,753,024 | A | * | 4/1930 | Rode | F16K 17/082 137/529 |
| 2,919,127 | A | * | 12/1959 | Prescott | F16F 9/512 267/64.15 |
| 3,095,011 | A | * | 6/1963 | Banker | F15B 13/14 137/625.69 |
| 4,280,601 | A | * | 7/1981 | Patriquin | F16F 9/3405 137/529 |
| 5,135,024 | A | * | 8/1992 | LeBlanc | B60K 15/0406 137/529 |

* cited by examiner

*Primary Examiner* — Robert K Arundale
(74) *Attorney, Agent, or Firm* — Scherrer Patent & Trademark Law, P.C.; Stephen T. Scherrer; Monique A. Morneault

(57) ABSTRACT

Apparatuses of the present invention create a backward pressure in fluid traversing a pipe, wherein the backward pressure within the pipe provides compression to the fluid effectively compressing entrapped gas bubbles within the fluid, allowing more accurate water meter measurements. The apparatus comprises a poppet valve having multiple springs to minimize or eliminate spring-binding caused by off-center hydraulic force during use.

20 Claims, 3 Drawing Sheets

APPARATUS, SYSTEMS AND METHODS FOR MANAGING FLUIDS COMPRISING A POPPET VALVE HAVING MULTIPLE SPRINGS

CROSS-REFERENCE TO RELATED APPLICATIONS

The present invention claims priority to U.S. Prov. Pat. App. No. 62/767,905, titled "Apparatus, Systems and Methods for Managing Fluids Comprising a Poppet Valve having Multiple Springs," filed Nov. 15, 2018, which is incorporated herein by reference in its entirety.

TECHNICAL FIELD

The present invention relates to apparatuses for managing the flow of fluids, such as, for example, water, through pipes. Specifically and without being bound by theory, the apparatuses of the present invention create a backward pressure in fluid traversing a pipe, wherein the backward pressure within the pipe provides compression to the fluid effectively compressing entrapped gas bubbles within the fluid, allowing more accurate water meter measurements. The apparatus comprises a poppet valve having multiple springs to minimize or eliminate spring-binding caused by off-center hydraulic force during use.

BACKGROUND

It is, of course, generally known to utilize pipes for transporting fluids, such as water, from one location to another. In modern times, users generally pay for the amount of water that flows into their homes or other buildings based on the volume of usage over a specific timeframe. Businesses, especially, can be saddled with high costs for water, especially when a large amount of water is necessary for industrial processes. Specifically, the more water a home or other building has flowing thereinto, the higher the cost to the user of the water.

However, water meters that measure the flow of water into a home or other building do so by reading the volume of fluid that passes through the water meter. Typically, water meters have a fan-like turbine apparatus that spins as the fluid flows therethrough. The rotation of the turbine apparatus directly correlates to the measurement of the volume of water through the water meter.

Importantly, since the water meter measures the volume of the fluid flowing therethrough, any additional component or material within the water may be falsely registered as water when, in fact, it is not. For example, entrapped gas bubbles, such as air, may accumulate within water pipes before the water reaches the water meter. The gas bubbles may artificially increase the volume flowing into the water meter, causing a false reading, since a water meter typically cannot distinguish between the volume of water and the volume of air. In other words, gas bubbles, such as air, entrapped within water flowing through pipes, may cause a water meter to register a higher volume of water than in actuality.

A need, therefore, exists, for apparatus, systems and methods for decreasing or removing the effect of entrapped bubbles within fluid, such as water, within a pipe. Further, a need exists for apparatus, systems and methods for providing a volume of fluid through a pipe that is more closely representative of the actual volume of the fluid within the pipe.

Specifically, a need exists for apparatus, systems and methods for removing the effect of entrapped gas bubbles within a fluid as the fluid flows through a meter, so that the meter may provide a more accurate reading of the volume of fluid flowing therethrough. In addition, a need exists for apparatus, systems and methods for effectively reducing the cost of water flowing into a home or other building.

Moreover, it is also generally known that water flowing into a home or other building may have periods of backflow, which may interfere with the quality of water that may flow into the home or other building. Specifically, while water may generally move in one direction during times of normal usage, certain occurrences of backflow may cause fouled water, contaminated water, or other fluids, to backflow, thereby fouling or otherwise contaminating the pipes and/or the source of the water.

Indeed, a flood within a home caused by extreme weather or other reasons may cause fouled water to flow the opposite direction within pipes. Moreover, it is feared that a terrorist may attempt to foul or otherwise contaminate fresh water by injecting or otherwise forcing an amount of a contaminated material, such as pathogenic, nuclear or other contamination, back through pipes from a water distribution node, such as a home or the like, into a water source. Backflow preventers are generally known that utilize a valve, such as a poppet or check valve to close when reverse pressure from backflow of fluids occurs. This may generally protect the pipes and/or the source of water from back flow conditions, caused by natural or unnatural conditions.

For example, U.S. Pat. Nos. 1,828,697 and 1,860,004, both to Yardley, disclose a check valve having a floating guide to allow the passage of fluids therethrough, but to prevent the backflow of fluids due to the valve body sitting on valve seat. However, neither of the Yardley patents recognizes the benefits of compressing gas within water or other fluid to provide a more accurate measurement of the flow of water therein in the manner presented herein, or providing a dual-chamber valve apparatus as disclosed in the present invention for backflow prevention.

In addition, U.S. Pat. App. Pub. No. 2012/0118406 to Edgeworth discloses apparatuses and systems to increase the efficiency of a water meter. However, Edgeworth suffers from lack of connectivity to pipes and other apparatuses, and use of an apparatus as described in Edgeworth will lead to failure of the apparatus as it is being used, as the springs are not guided to maintain their positions within the apparatus.

However, although backflow preventers within pipes may be required in certain circumstances, backflow prevention is not a requirement in many homes. Thus, many homes or other buildings do not have this important safety feature.

In addition, typical valves utilized to increase the efficiency of water meters utilize a traditional poppet valve configuration, namely a valve head that sits on a valve head seat having a single shaft and spring combination that opens and closes in an oscillating manner based on the water pressure against the valve head. However, the single shaft and spring combination can pose problems. Specifically, the single spring must typically bear the full force of the water pressure, and may become worn over time due to the stress and strain placed thereon. Moreover, if water pressure hits the valve head off-center, which may occur if there is a large amount of air in the pipe, then the valve head may oscillate unevenly, adding further stress to the spring, and increasing the risk of spring displacement or binding.

A need, therefore, exists for improved apparatuses to increase the efficiency of water meters to read a true measurement of a flow of water therethrough. A need further exists for improved apparatuses that are resilient to failure during periods of long use, and can be relied upon.

In addition, a need exists for apparatus, systems and methods that may be utilized as a backflow prevention device within a pipe, such as within a water pipe utilized to distribute fresh and clean water to a home or other building. Moreover, a need exists for apparatus, systems and methods that encourage homeowners or other building owners to install backflow preventers within their pipes to protect their pipes and sources of water.

A need further exists for apparatus, systems and methods that provide the dual purpose of more accurately measuring the flow of water within pipes as well as providing backflow prevention in the event of backflow.

A need further exists for apparatus, systems and methods that disperse the energy impacting the valve head to increase the life of the valve. Specifically, a need exists for apparatus, systems and methods that more readily withstand off-center impacts of water pressure against the valve head that may otherwise lead to stress and strain and a decrease in the working life of the valve.

SUMMARY OF THE INVENTION

The present invention relates to apparatuses for managing the flow of fluids, such as, for example, water, through pipes. Specifically and without being bound by theory, the apparatuses of the present invention create a backward pressure in fluid traversing a pipe, wherein the backward pressure within the pipe provides compression to the fluid effectively compressing entrapped gas bubbles within the fluid, allowing more accurate water meter measurements. The apparatus comprises a poppet valve having multiple springs to minimize or eliminate spring-binding caused by off-center hydraulic force during use.

To this end, in an embodiment of the present invention, a poppet valve is provided in-line with a water line, wherein oscillation is induced in the poppet valve. The poppet valve comprises a base having at least one aperture therein. The poppet valve further comprises a valve head seated on a valve seat, the valve stem comprising a plurality of rods extending from the valve seat to the base, each of the plurality of rods comprising a first spring element and a second spring element, the valve head comprising a plurality of flanges extending from sides of the valve head, each of the flanges having an aperture wherein a respective rod slides therethrough, the first spring element disposed on a first side of the flange and the second spring element disposed on a second side of the flange. The first spring of each of the rods, disposed on the first side of the flange, pushes the valve head against the valve seat. Water pressure pushes the valve head off the valve seat and compresses each of the springs on the first side of the flange.

In an embodiment, a poppet valve apparatus is provided. The poppet valve apparatus comprises: a housing comprising a first end and a second end; a base disposed proximal to the first end of the housing and having at least one aperture therein; a valve seat proximal to the second end of the housing; valve head configured to seat on a valve seat; a plurality of rods extending from the valve seat to the base, each of the plurality of rods comprising a first spring element and a second spring element, and a plurality of tabs extending from a periphery of the valve head, each of the tabs having an aperture wherein a respective rod slides therethrough, the first spring element of each rod disposed on a first side of a respective tab and the second spring element disposed on a second side of the respective tab.

In an embodiment, the first and second springs of each of the plurality of rods are configured to cause the valve head to open at the seat when acted upon by a fluid pressure sufficient to allow fluid to flow therethrough and to close upon the release of the fluid pressure, and further wherein the first and second springs of the plurality of rods are configured to cause the valve head to repeatedly open and close on the valve seat in an oscillating manner when fluid flows therethrough.

In an embodiment, the fluid pressure is water pressure and the fluid is water.

In an embodiment, the valve head is spherical.

In an embodiment, the plurality of tabs are distributed evenly around the periphery of the valve head.

In an embodiment, the aperture within the base is conical.

In an embodiment, the poppet valve apparatus further comprises: a first connector on the first end of the housing configured to connect the first end of the housing to a first pipe; and a second connector on the second end of the housing configured to connect the second end of the housing to a second pipe.

In an embodiment, the first connector and the second connector are compression fittings.

In an embodiment, the plurality of rods each comprises a rod segment that passes within the respective first spring and the respective second spring.

In an embodiment, the second spring of each of the plurality of rods is integrally formed with the respective rod.

In an embodiment, the first spring and the second spring of each of the plurality of rods have different spring constants.

In an embodiment, the plurality of rods comprises three rods and the plurality of tabs comprises three tabs, wherein each of the plurality of rods comprises a rod segment that passes through each respective aperture of the plurality of tabs.

In an alternate embodiment of the present invention, a system of managing fluid through pipes is provided. The system comprises: the poppet valve apparatus; a first pipe, wherein the first end of the housing is connected to the first pipe; and a second pipe, wherein the second end of the housing is connected to the second pipe.

In an embodiment, the system further comprises fluid flowing through the first pipe, the housing, and the second pipe.

In an embodiment, the fluid is water.

In an embodiment, the first end of the housing is connected to the first pipe with a first compression fitting and the second end of the housing is connected to a second pipe with a second compression fitting.

In an embodiment, the first and second springs of each of the plurality of rods are configured to cause the valve head to open at the valve seat when acted upon by a fluid pressure sufficient to allow the fluid to flow therethrough and to close upon the release of the fluid pressure, and further wherein the first and second springs of the plurality of rods are configured to cause the valve head to repeatedly open and close on the valve seat in an oscillating manner when the fluid flows therethrough.

In an alternate embodiment of the present invention, a method of managing fluid through pipes is provided. The method comprises the steps of: providing the poppet valve apparatus; connecting the first end of the housing to a first pipe; and connecting the second end of the housing to a second pipe.

In an embodiment, the method further comprises the step of: providing fluid flowing through the first pipe, the housing, and the second pipe.

In an embodiment, the first and second springs of each of the plurality of rods are configured to cause the valve head to open at the valve seat when acted upon by a fluid pressure sufficient to allow the fluid to flow therethrough and to close upon the release of the fluid pressure, and further wherein the first and second springs of the plurality of rods are configured to cause the valve head to repeatedly open and close on the valve seat in an oscillating manner when the fluid flows therethrough.

It is, therefore, an objective and advantage of the present invention to provide improved apparatuses, systems and methods to increase the efficiency of water meters to read a true measurement of a flow of water therethrough.

It is a further objective and advantage of the present invention to provide improved apparatuses, systems and methods that are resilient to failure during periods of long use, and can be relied upon.

It is also an objective and advantage of the present invention to provide apparatuses, systems and methods for decreasing or removing the effect of entrapped bubbles within fluid, such as water, within a pipe.

Further, it is an objective and advantage of the present invention to provide apparatuses, systems and methods for providing a volume of fluid through a pipe that is more closely representative of the actual volume of the fluid within the pipe.

Specifically, it is an objective and advantage of the present invention to provide apparatuses, systems and methods for removing the effect of entrapped gas bubbles within a fluid as the fluid flows through a meter, so that the meter may provide a more accurate reading of the volume of fluid flowing therethrough.

In addition, it is an advantage and objective of the present invention to provide apparatuses, systems and methods for effectively reducing the cost of water flowing into a home or other building.

Moreover, it is an objective and advantage of the present invention to provide apparatuses, systems and methods that may be utilized as a backflow prevention device within a pipe, such as within a water pipe utilized to distribute fresh and clean water to a home or other building.

Moreover, it is an advantage and objective to provide apparatus, systems and methods that encourage homeowners or other building owners to install backflow preventers within their pipes to protect their pipes and sources of water.

It is a further advantage and objective of the present invention to provide apparatuses, systems and methods that provide the dual purpose of more accurately measuring the flow of water within pipes as well as providing backflow prevention in the event of backflow.

Further, it is an advantage and objective of the present invention to provide apparatus, systems and methods that disperse the energy impacting the valve head to increase the life of the valve.

Specifically, it is an advantage and objective of the present invention to provide apparatus, systems and methods that more readily withstand off-center impacts of water pressure against the valve head that may otherwise lead to stress and strain and a decrease in the working life of the valve.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to apparatuses for managing the flow of fluids, such as, for example, water, through pipes. Specifically and without being bound by theory, the apparatuses of the present invention create a backward pressure in fluid traversing a pipe, wherein the backward pressure within the pipe provides compression to the fluid effectively compressing entrapped gas bubbles within the fluid, allowing more accurate water meter measurements. The apparatus comprises a poppet valve having multiple springs to minimize or eliminate spring-binding caused by off-center hydraulic force during use.

Figure 1:
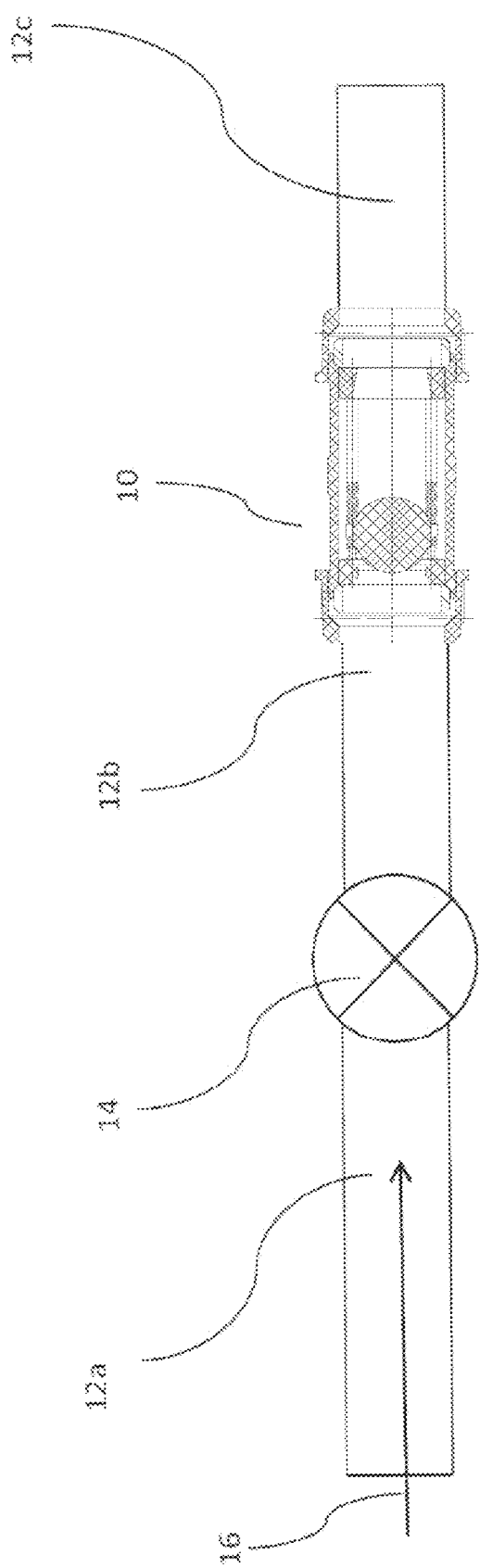
FIG. 1 illustrates a representative of an apparatus of the present invention in-line within a pipe in position to affect the measured volume of water flowing through a water meter in an embodiment of the present invention.

Referring now to the figures, wherein like numerals refer to like parts, FIG. 1 illustrates a representation of an apparatus 10 in an embodiment of the present invention. The apparatus 10 may be disposed in-line with a pipe, represented by pipe sections 12a, 12b, 12c that may provide a flow of a fluid therethrough. The fluid may flow, generally, from left to right in FIG. 1, as represented by the arrow 16. In a preferred embodiment, the fluid may be water, and the pipe sections 12a, 12b, 12c may be parts of a water distribution pipe allowing the flow of fresh and clean water into a home or another building, as apparent to one of ordinary skill in the art. For purposes of the present invention, the fluid will be described as water. It should be noted, however, that the apparatus 10 of the present invention may be utilized for impacting the flow of other fluids and should not be limited as described herein.

Also, in-line with the pipe may be a water meter 14 for measuring the volume of water flowing therethrough. Thus, given a certain period of time, a total volume of water may be determined based on the rate of flow of water volume through the water meter 14. The water meter may be any water meter apparent to one of ordinary skill in the art, and the specific type of water meter is unimportant for purposes of the present invention. It is typical for water flowing within pipes, especially from a source, to contain an amount of air bubbles or other gas entrapped within the water. Gas bubbles within the water flowing through the water meter 14 may cause a falsely higher measurement of water volume flowing therethrough, leading to an inaccurate report. An inaccurate report of the volume of water flowing through the water meter 14 may cause an artificially increased cost of water consumption.

While not being bound by theory, water flowing through the pipe of the present invention may be compressed by having an amount of backward pressure induced on the fluid by the apparatus 10. Specifically, the valve contained within the apparatus 10, as shown in more detail below with respect to FIGS. 2-4, may induce a back pressure on the water upstream from the apparatus 10, thereby compressing the air bubbles in the water upstream from the apparatus 10. The compression of the water compresses the air bubbles within the water to take up a small volume of space in the vicinity immediately upstream from the apparatus 10. Specifically, the compression of the air bubbles may be maintained for approximately five to ten feet upstream from the apparatus 10. Thus, positioning the apparatus downstream but within proximity of the water meter 14 may allow the water meter to measure a truer and more accurate volume of water flowing within the pipe. Thus, it is preferred that the apparatus 10 of the present invention be positioned within three to ten feet downstream of the water meter 14, more preferably four feet to seven feet downstream of the water meter 14, although the present invention should not be limited as described herein.

In operation, a poppet (detailed below) within apparatus 10 oscillates as pressure builds within the pipe 12b, caused by the apparatus 10 pushing back against the flow of water therethrough. The oscillation of the poppet causes the compression of gas within the fluid upstream of the apparatus 10, causing a truer reading of the fluid flow through the water mater 14.

Figure 2:
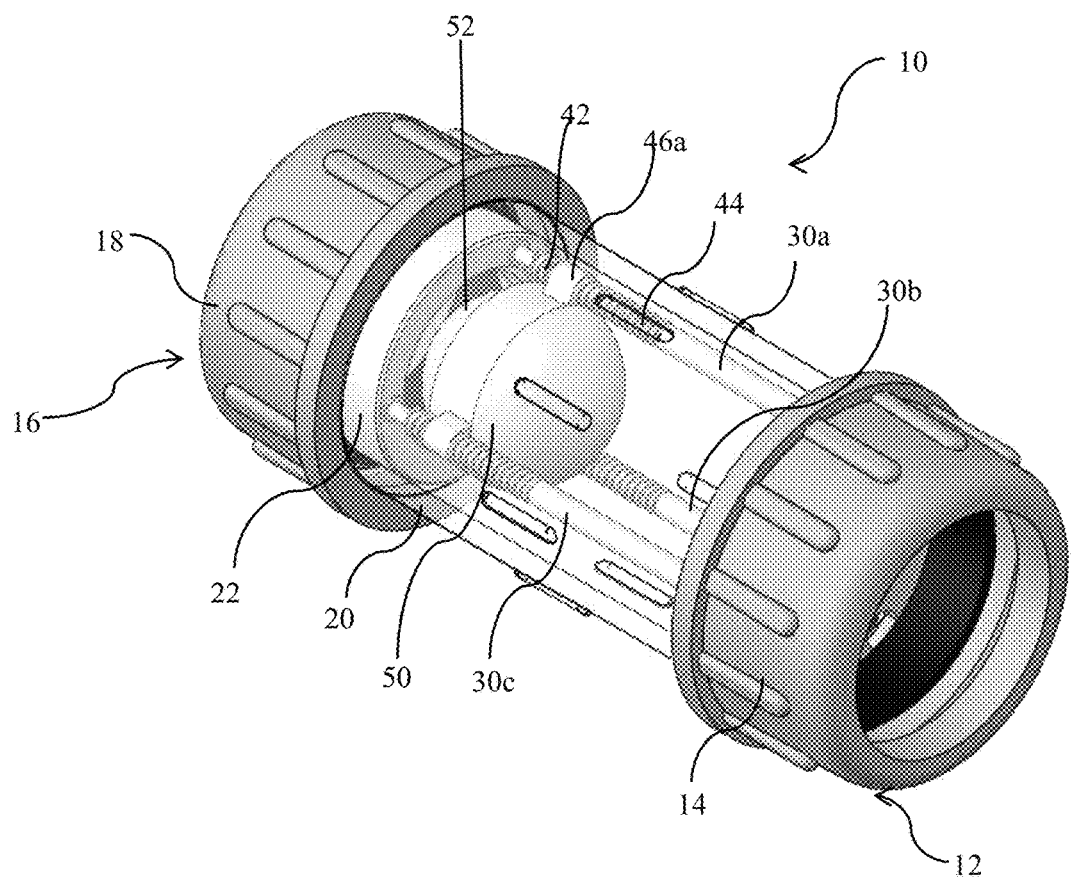
FIG. 2 illustrates a perspective view of an apparatus for managing the flow of fluids in a pipe in an embodiment of the present invention.

FIG. 2 illustrates a perspective view of apparatus 10 in an embodiment of the present invention. Apparatus 10 comprises a first end 12 having a first compression fitting 14 and a second end 16 having a second compression fitting 18 thereon. The first and second compression fittings 14, 18 allow the apparatus to be connected in-line with water-distribution pipes as part of a water distribution system, as described above with reference to FIG. 1. The compression fittings allow easy connection to other pipes; however, it should be noted that other connection mechanisms are contemplated by the present invention, and the present invention should not be limited as described herein. Specifically, first and second ends 12, 16 may have flanges that may bolt to mating flanges on pipes, or may include threads for engaging mating threads on other pipes, for example.

Figure 3:
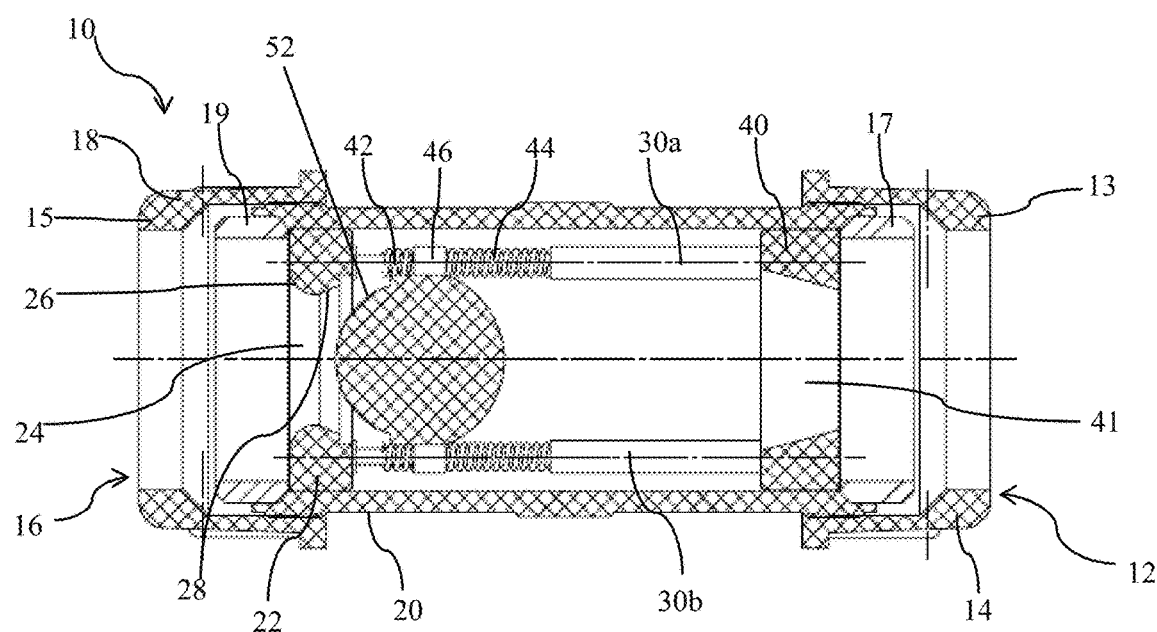
FIG. 3 illustrates a cross-sectional view of an apparatus for managing fluids in a pipe in an embodiment of the present invention.
Figure 4:
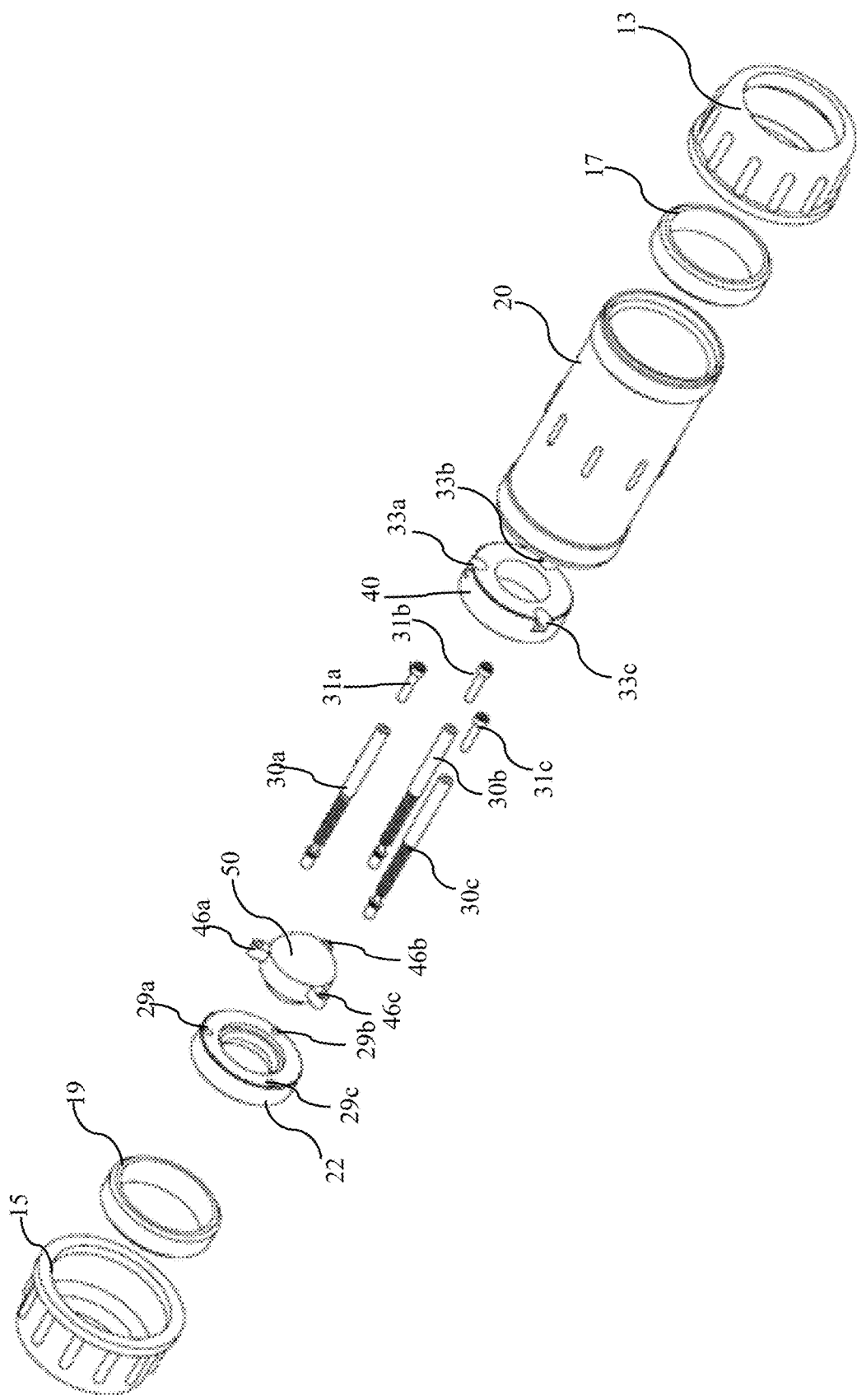
FIG. 4 illustrates an exploded view of an apparatus for managing fluids in a pipe in an embodiment of the present invention.

The first and second compression fittings 24, 28 may comprise first and second compression caps 13, 15, respectively and first and second rubber olives 17, 19, respectively, to compress and seal when disposed on respective pipe ends, as illustrated in FIGS. 3 and 4.

The apparatus may comprise a housing 20 that may be tubular in shape and may be sized to allow a flow of water therethrough. Within the housing 20 may be a valve seat 22 on the second end 16 of the apparatus 10 having an aperture 24 therethrough that allows water to flow therethrough, as illustrated in FIG. 3. The shape of the aperture 24 may have a first surface section 26 that restricts the flow of water therethrough, and a second surface section 28 that expands the flow of water therethrough, thereby creating a Venturi effect on the water flowing therethrough that may decrease turbulence of water.

Extending from the valve seat may be a plurality of rods 30a, 30b, 30c that extend from a periphery of the valve seat 22 to a base 40 at or near the first end 12 of the apparatus 10. Each rod may have a first spring element 42 and a second spring element 44. Between the first spring element 42 and the second spring element 44 may be a flange 46a (as illustrated in FIG. 2) extending from a valve head 50 that may be positioned between the plurality of rods 30a, 30b, 30c. The valve head 50 may have a plurality of flanges, 46a, 46b, 46c connected to rods 30a, 30b, 30c, respectively, as illustrated in FIG. 4. Although the present invention shows and describes three rods, it should be noted that any number of rods may be incorporated therein, from two to more than three, so as to disperse the hydraulic energy impacting the valve head 50, and the present invention should not be limited as described herein.

The valve head 50 may have a valve surface 52 that may engage the second surface section 28 of the valve seat 22, thereby sealing the passage of water flowing therethrough when sitting thereon. As illustrated in FIGS. 2-4, the valve head 50 may be spherical in shape, which may be preferable to allow water to flow therearound when the valve head 50 lifts from the second surface section 28 to allow water to flow therethrough when in use. However, it should be noted that the valve head 50 may have any shape apparent to one of ordinary skill in the art, and the present invention should not be limited as described herein. In addition, the base 40 comprises an aperture 41 therethrough, allowing water to pass when released by the valve head 50, as described herein. The aperture 41 may be angled and form a conical internal surface to restrict the flow of water therethrough as the water exits the apparatus 10 through first end 12.

The first spring element 42 may act to restrict the urging of the valve head 22 against the valve seat 22, whereas the second spring element 44 may urge the valve head 50 against the valve seat 22. Therefore, the particular compression strengths of the first and second spring elements 42, 44 may be selected to precisely ensure that the valve head 50 moves from the valve seat 22 when desired. The first and second spring elements 42, 44 may be separate springs that wrap around the rods 30a, 30b, 30c, or may be integrally formed in the rods 30a, 30b, 30c.

The use of a plurality of spring elements and a plurality of rods to hold the spring elements disperses the energy impacting the valve head, thereby enhancing the working life of the valve compared to traditional poppet valves. Moreover, the use of a plurality of rods and springs stabilizes the movement of the valve head 50 from the valve seat 22, especially when off-center hydraulic force is applied against the valve head 50.

FIG. 4 illustrates an exploded view of the apparatus 10 in an embodiment of the present invention. As illustrated in FIG. 4, rods 30a, 30b, 30c may be disposed within apertures 29a, 29b, 29c, respectively, within the periphery of the valve seat 22, and may preferably be threaded therein, but may be held via other methods as well. Likewise, the rocs 30a, 30b, 30c may be held within apertures 33a, 33b, 33c within base 40 via bolts 31a, 31b, 31c, respectively.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

We claim:
1. A poppet valve apparatus comprising:
a housing comprising a first end and a second end;
a base disposed proximal to the first end of the housing and having at least one aperture therein;
a valve seat proximal to the second end of the housing;
valve head configured to seat on a valve seat;

a plurality of rods extending from the valve seat to the base, each of the plurality of rods comprising a first spring element and a second spring element, a plurality of tabs extending from a periphery of the valve head, each of the tabs having an aperture wherein a respective rod slides therethrough, the first spring element of each rod disposed on a first side of a respective tab and the second spring element disposed on a second side of the respective tab.

2. The poppet valve apparatus of claim 1 wherein the first and second springs of each of the plurality of rods are configured to cause the valve head to open at the seat when acted upon by a fluid pressure sufficient to allow fluid to flow therethrough and to close upon the release of the fluid pressure, and further wherein the first and second springs of the plurality of rods are configured to cause the valve head to repeatedly open and close on the valve seat in an oscillating manner when fluid flows therethrough.

3. The poppet valve apparatus of claim 2 wherein the fluid pressure is water pressure and the fluid is water.

4. The poppet valve apparatus of claim 1 wherein the valve head is spherical.

5. The poppet valve apparatus of claim 1 wherein the plurality of tabs are distributed evenly around the periphery of the valve head.

6. The poppet valve apparatus of claim 1 wherein the aperture within the base is conical.

7. The poppet valve apparatus of claim 1 further comprising:
a first connector on the first end of the housing configured to connect the first end of the housing to a first pipe; and
a second connector on the second end of the housing configured to connect the second end of the housing to a second pipe.

8. The poppet valve apparatus of claim 7 wherein the first connector and the second connector are compression fittings.

9. The poppet valve apparatus of claim 1 wherein the plurality of rods each comprises a rod segment that passes within the respective first spring and the respective second spring.

10. The poppet valve apparatus of claim 1 wherein the second spring of each of the plurality of rods is integrally formed with the respective rod.

11. The poppet valve apparatus of claim 1 wherein the first spring and the second spring of each of the plurality of rods have different spring constants.

12. The poppet valve apparatus of claim 1 the plurality of rods comprises three rods and the plurality of tabs comprises three tabs, wherein each of the plurality of rods comprises a rod segment that passes through each respective aperture of the plurality of tabs.

13. A system of managing fluid through pipes comprising:
the poppet valve apparatus of claim 1;
a first pipe, wherein the first end of the housing is connected to the first pipe; and
a second pipe, wherein the second end of the housing is connected to the second pipe.

14. The system of claim 13 further comprising fluid flowing through the first pipe, the housing, and the second pipe.

15. The system of claim 14 wherein the fluid is water.

16. The system of claim 13 wherein the first end of the housing is connected to the first pipe with a first compression fitting and the second end of the housing is connected to a second pipe with a second compression fitting.

17. The system of claim 14 wherein the first and second springs of each of the plurality of rods are configured to cause the valve head to open at the valve seat when acted upon by a fluid pressure sufficient to allow the fluid to flow therethrough and to close upon the release of the fluid pressure, and further wherein the first and second springs of the plurality of rods are configured to cause the valve head to repeatedly open and close on the valve seat in an oscillating manner when the fluid flows therethrough.

18. A method of managing fluid through pipes comprising the steps of:
providing the poppet valve apparatus of claim 1;
connecting the first end of the housing to a first pipe; and
connecting the second end of the housing to a second pipe.

19. The method of claim 18 further comprising the step of:
providing fluid flowing through the first pipe, the housing, and the second pipe.

20. The method of claim 19 wherein the first and second springs of each of the plurality of rods are configured to cause the valve head to open at the valve seat when acted upon by a fluid pressure sufficient to allow the fluid to flow therethrough and to close upon the release of the fluid pressure, and further wherein the first and second springs of the plurality of rods are configured to cause the valve head to repeatedly open and close on the valve seat in an oscillating manner when the fluid flows therethrough.

* * * * *